Mar. 13, 1923.
D. PALMER-JONES.
SCAFFOLDING OR THE LIKE TEMPORARY ERECTION.
FILED AUG. 4, 1921.
1,448,503.
2 SHEETS—SHEET 1.
FIG. 2.
FIG. 1.
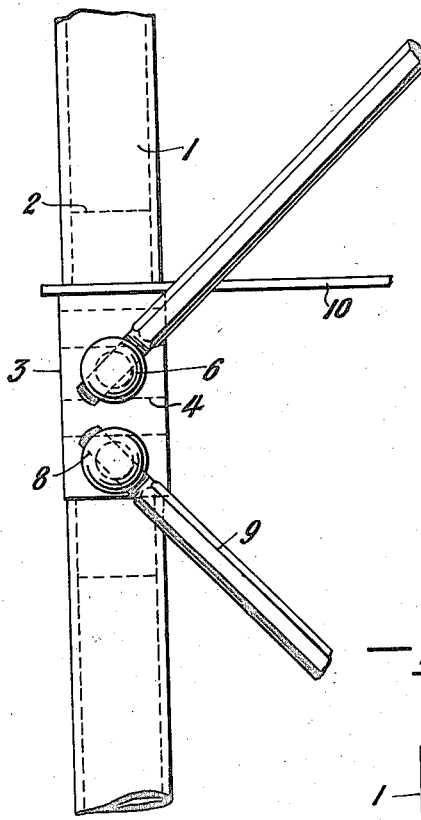
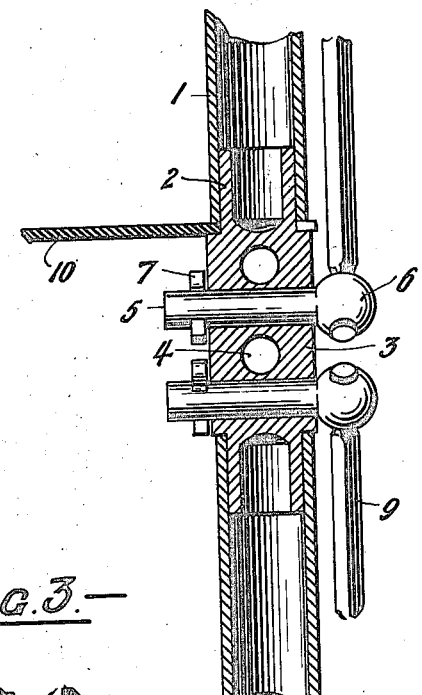
FIG. 3.
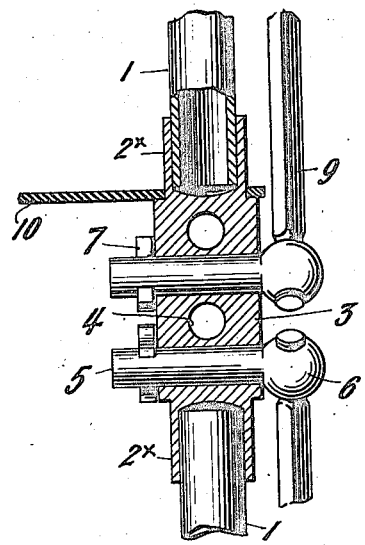
Inventor.
Daniel Palmer-Jones.
By
his attorneys.

Mar. 13, 1923.
D. PALMER-JONES.
SCAFFOLDING OR THE LIKE TEMPORARY ERECTION.
FILED AUG. 4, 1921.
1,448,503.
2 SHEETS—SHEET 2.
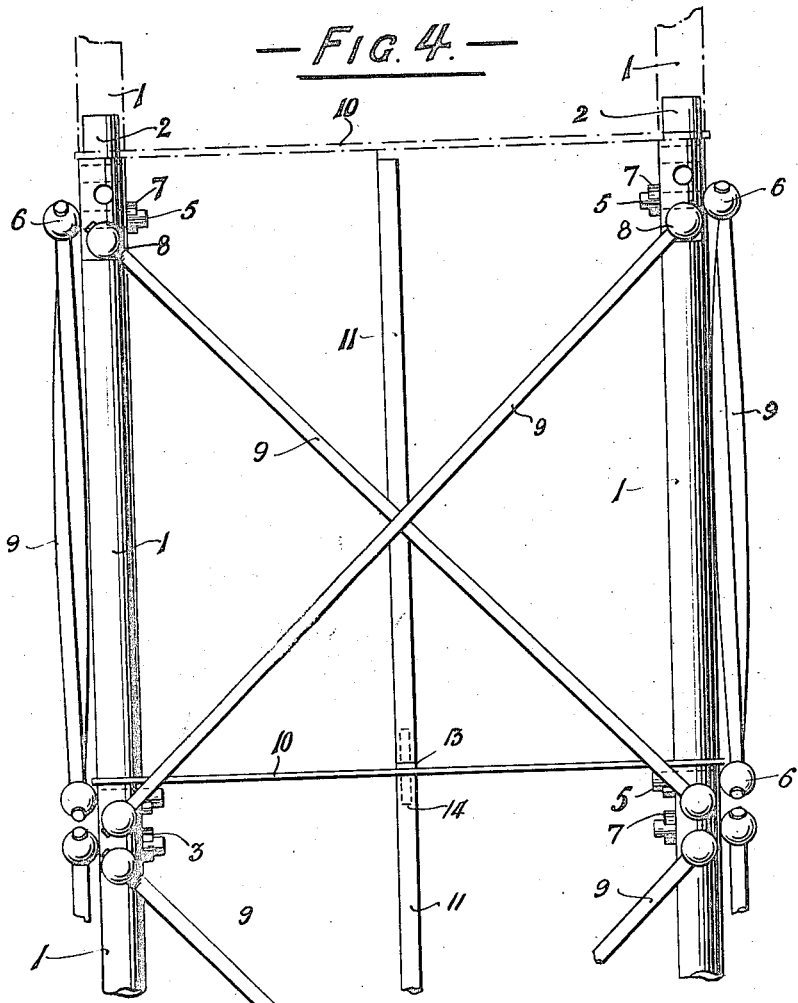
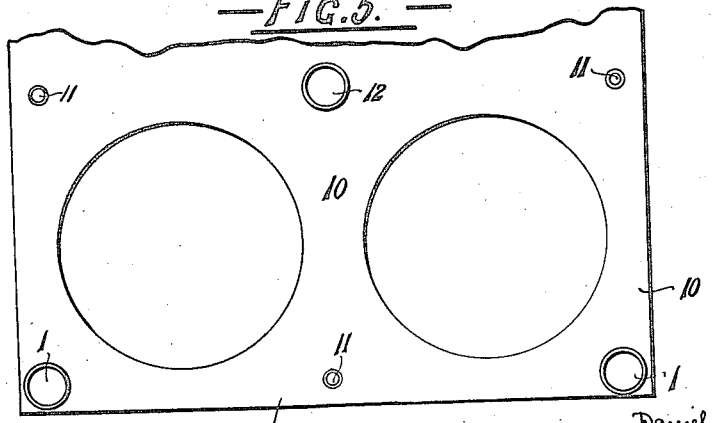

Patented Mar. 13, 1923.

1,448,503

UNITED STATES PATENT OFFICE.

DANIEL PALMER-JONES, OF LONDON, ENGLAND, ASSIGNOR TO THE TUBULAR SCAFFOLDING COMPANY LIMITED, OF LONDON, ENGLAND.

SCAFFOLDING OR THE LIKE TEMPORARY ERECTION.

Application filed August 4, 1921. Serial No. 489,834.

*To all whom it may concern:*

Be it known that I, DANIEL PALMER-JONES, a subject of the King of Great Britain, residing at London, England, have invented certain new and useful Improvements in Scaffolding or the like Temporary Erections, for which I have filed an application for Letters Patent in Great Britain on December 18, 1919, under No. 31,747 of 1919, Patent No. 160,276, December 18, 1919, of which the following is a specification.

In constructing tubular metal scaffolding the tubes composing which are in sections of a desired length and in which it is required that the tubes shall be coaxially connected one with the other to constitute a scaffolding member of the requisite length, I have heretofore proposed to connect the tube sections together by connection members each consisting of a central enlargement or collar constructed upon opposite ends with spigots or sockets, the spigots entering the ends of two adjacent tubes which would then bear upon the edges of the collar, or the tubes entered the sockets and bore upon the collar, and the tubes were to be secured to the spigots or sockets of the connection members by pins or the like passing through such spigots or sockets and through the tubes.

Now the present invention refers to the construction of scaffolding composed of a plurality of scaffold poles each composed of sections of tube connected after the manner above stated, and especially refers to means hereafter claimed and described whereby a scaffolding structure composed of such plurality of scaffold poles can be firmly and easily connected together, and the tubes firmly held to their connection members simultaneously with and by the same means utilised for bracing the various scaffolding poles so constructed in fixed relation to each other.

The invention will be readily understood by the description referring to the accompanying drawings.

Fig. 1 shows in vertical section a connection member having spigot ends and connecting two sections of tube forming a portion of a tubular scaffold pole and means for bracing the various tubular poles in fixed relation with each other, and Fig. 2 is an elevation of the same parts at right angles to Fig. 1. Fig. 3 is a view similar to Fig. 1 showing the connection mechanism with socket ends. Fig. 4 is a front elevation of a portion of a column having its component parts rigidly held together according to this invention, and Fig 5 is a partial plan view of a frame or plate used in the erection of the scaffold column.

Referring more particularly to Figs. 1 and 2 of the drawings, two sections of tube 1 forming a portion of a scaffold pole are shown in position upon a connection member, which latter is formed with two oppositely projecting spigots 2 and an enlarged central portion 3. The spigots 2 are of a reduced diameter to allow of their entering and fitting within the ends of the tubular sections 1 which are to form the scaffold pole. In the enlarged central portion 3 of each connection member, holes 4 are formed, four holes being shown in the example. The holes 4 are formed at right angles to the axis of the connection member, two in one vertical plane and two in a vertical plane at right angles thereto.

Fig. 3 corresponds to Fig. 1, excepting sockets 2$^x$ are substituted for the spigots 2 of Fig. 1.

Pins 5 each having a plain stem and an enlarged head 6 fit into the holes 4, and the outer end of each pin 5 is pierced to receive a cotter 7 to prevent displacement of the pin 5. In the enlarged head 6 of each of the pins a hole 8 is bored at right angles to the stem 5 and is internally screwthreaded to receive the ends of bracing members 9. These bracing members 9 are each screwthreaded at their ends, one end having a right handed thread and the other end a left handed thread adapted to engage with the holes 8 in the heads of the pins 5. The bracing members 9 are polygonal in cross section for the whole or it may be a portion of their length to enable them to be turned axially by a suitable tool, to engage to a more or less degree with the holes 8 in the heads of the pins 5.

For suitably spacing the tubular members forming adjacent scaffold poles, spacing plates or frames 10 formed with holes at the required distance apart are passed over the spigots 2 of the connection members and rest on the shoulders formed by the enlarged central portion 3 of said members, and the next series of tubular members 1 are then placed on the spigots 2 protruding through the holes in the said plate 10, their lower ends resting on the surface of the said plate.

In assembling the above described parts for the erection of a scaffold, sections of tube 1 are passed onto the spigots 2 of the connection member to constitute a scaffold pole, and a similar pole having been erected in like manner and suitably distanced apart, a bracing member 9 such as before described, is fitted at each end into the oppositely threaded holes 8 in the heads 6 of two pins 5. One pin 5 on the bracing member 9 is passed into one of the holes 4 in one connection member immediately above the upper end of a tubular section 1 of one pole, and the pin at the other end of the bracing member is passed into a hole in the connection member immediately below the lower end of the corresponding section of the adjacent pole. When a desired number of bracing rods have been placed in position they are each turned axially to hold together and brace the structure.

In erecting a scaffold of the type shown in Fig. 4 which is a rectangular (or it might be triangular or polygonal) self-supporting structure, main tubular poles 1 and auxiliary intermediate poles 11, one between each of the main poles are spaced apart by means of the plate 10 as indicated at Fig. 5, and if desired an additional central pole is used in the position indicated at 12 in Fig. 5.

The intermediate poles 11 are of smaller diameter than the main poles 1, each section being connected to its adjacent section by a connection member having a central portion 13, and two spigots 14 upon which the tubes are passed, and the underside of the central portion 13 rests upon the upper surface of the spacing plate 10.

Each main tubular pole 1 is constructed, as before described, from sections of tube passed onto the spigots 2 of connection members having enlarged central portions 3, the spacing plate or frame 10 being interposed between the enlarged portions 3 of said members and the lower end of each tubular section 1.

Bracing members, the ends of which are connected to the central enlarged parts 3 of the connection members, connect the connection member beneath the tubular section 1 of one pole with the connection member above the corresponding tubular section 1 of the adjacent pole, and these bracing members 9 are axially turned in the construction shown, to tighten and brace the structure, and each of the four sides is braced and held in a similar manner.

It will be seen from the foregoing description that a number of rigid units are constructed, each of which comprises sections of tubular poles 1, passed on to the spigots of a series of upper and lower connection members, a spacing plate 10 interposed between the lower ends of the tubular sections 1 and upper edge of the enlarged portion 3 of the lower connection members, and a suitable number of bracing members 9 and pins 5. In erecting a scaffold, one of these units may be used as a base, and a plate 10 and tubular sections 1 may be placed over the upstanding spigots 2 as indicated in dotted lines at Fig. 4, and so on.

It is obvious that instead of the tubular members 1 passing over the spigots 2, the connection members may be formed with sockets 2$^x$ Fig. 3 into which the ends of the tubes may pass.

What I claim as my invention and desire to secure by Letters Patent is:—

1. A scaffolding comprising a plurality of scaffold poles each composed of sections of tube, connection members to coaxially connect said tube sections of each scaffold pole, each connection member having a central portion of extended length and suitable diameter and two opposite end portions of lesser diameter to engage said tube sections, said central portion having a plurality of holes formed through same at right angles to the axis of said central portion and at required angles to each other, tension bracing members to extend angularly between adjacent scaffold poles, pins to enter and engage in said holes of said central portions of said connection members, means for retaining said pins in said holes, heads on said pins bored at right angles to the axes of said pins to receive the ends of said tension members extending at right angles to the axes of said pins, and means in connection with said heads of said pins for connecting the ends of said tension members thereto and tensioning said tension members.

2. A scaffolding; comprising a plurality of scaffold poles each composed of sections of tube, connection members to coaxially connect said tube sections of each scaffold pole, each connection member having a central portion of extended length and suitable diameter and two opposite end portions of lesser diameter to engage said tube sections, said central portion having a plurality of holes formed through same at right angles to the axis of said central portion and at required angles to each other, pins to enter and engage in said holes of said central portions of said connecting members, means for retaining said pins in said holes, heads on said pins each bored at right angles to the axis of said pin and screwthreaded, tension bracing members to extend angularly between adjacent scaffold poles and having the ends of said tension members screwthreaded right and lefthandedly respectively to engage said screwthreaded holes in the heads of said pins, and means to enable said bracing members to be turned about their axes to tension same.

3. A scaffolding; comprising a plurality of scaffold poles each composed of sections of tube, connection members to connect said tube sections of each scaffold pole coaxially, each connection member having a central portion of extended length and suitable diameter and two opposite end portions of lesser diameter to engage said tube sections, said central portion having a plurality of holes formed through same at right angles to the axis of said central portion and at required angles to each other, tension bracing members to extend angularly between adjacent scaffolding poles, pins to engage in said holes of said central portions of said connection members, means for retaining said pins in said holes, heads on said pins bored at right angles to the axis of said pins to receive the ends of said tension members, and means in connection with said heads of said pins for tensioning said tension members, each tension member extending from a pin in said central portion of a connection member at the upper end of one section of a scaffolding pole to a pin in said central portion of a connection member below the lower end of an opposite section of an adjacent scaffold pole, whereby said sections of said poles may be firmly held to said connection members and in fixed relation to each other.

4. A scaffolding; comprising a plurality of scaffold poles each composed of sections of tube, connection members to connect said tube sections of each scaffold pole coaxially, each connection member having a central portion of extended length and suitable diameter and two opposite end portions of lesser diameter to engage said tube sections, said central portion having a plurality of holes formed through same at right angles to the axis of said central portion and at required angles to each other, tension bracing members to extend angularly between adjacent scaffolding poles, pins to engage in said holes of said central portions of said connection members, means for retaining said pins in said holes, heads on said pins bored at right angles to the axis of said pins and screwthreaded to receive right and left-handed screw-threaded ends of said tension members, and means for turning said tension members about their axes to tension said members, each tension member extending from a pin in said central portion of a connection member at the upper end of one section of a scaffolding pole to a pin in said central portion of a connection member below the lower end of an opposite section of adjacent scaffold pole, whereby said sections of said poles may be firmly held to said connection members and in fixed relation to each other.

5. A scaffolding; comprising a plurality of scaffold poles each composed of coaxially connected sections of tube, connection members to connect said tube sections of each scaffold pole coaxially, each connection member having a central portion of extended length and suitable diameter and two opposite end portions of lesser diameter, a spacing member having holes at required distances apart to pass over said end portions of said connection members for spacing said scaffold poles apart, said end portions of said connection members being adapted to enter and engage said tube sections, said central portion of each connection member having a plurality of holes formed through same at right angles to the axis of said central portion and at required angles to each other, tension bracing members to extend angularly between adjacent scaffolding poles, pins to engage in said holes of said central portions of said connection members, means for retaining said pins in said holes, heads on said pins bored at right angles to the axis of said pins to receive the ends of said tension members, and means in connection with said heads of said pins for tensioning said tension members, each tension member extending from a pin in said central portion of a connection member at the upper end of one section of a scaffolding pole to a pin in said central portion of a connection member below the lower end of an opposite section of an adjacent scaffold pole, whereby said sections of said poles may be firmly held to said connection members and in fixed relation to each other.

In witness whereof I have hereunto set my hand in the presence of two witnesses.

DANIEL PALMER-JONES.

Witnesses:
   THOMAS WILLIAM ROGERS,
   WILLIAM A. MARSHALL.